United States Patent [19]

Engler

[11] Patent Number: 4,722,716
[45] Date of Patent: Feb. 2, 1988

[54] UNIVERSAL JOINT
[75] Inventor: Louis C. Engler, Heber Springs, Ark.
[73] Assignee: Roland R. Remmel, a part interest
[21] Appl. No.: 941,811
[22] Filed: Dec. 15, 1986
[51] Int. Cl.$^4$ .............................................. F16D 3/36
[52] U.S. Cl. ..................................... 464/139; 464/152
[58] Field of Search ............... 464/106, 134, 135, 136, 464/139, 147, 150, 152, 182, 906

[56] References Cited

U.S. PATENT DOCUMENTS

| | | | |
|---|---|---|---|
| 634,540 | 10/1899 | Prior | 464/135 |
| 1,743,672 | 1/1930 | Hufferd | 464/139 |
| 2,575,602 | 11/1951 | Stillwagon, Jr. | 464/134 |
| 2,904,975 | 9/1959 | Miller | 464/139 |
| 3,310,959 | 3/1967 | Sheppard | 464/139 |
| 3,486,349 | 12/1969 | Ritsema | 464/134 X |

FOREIGN PATENT DOCUMENTS

| | | | |
|---|---|---|---|
| 719856 | 4/1942 | Fed. Rep. of Germany | 464/135 |
| 423008 | 5/1948 | Italy | 464/139 |
| 575698 | 2/1946 | United Kingdom | 464/135 |
| 1126110 | 9/1968 | United Kingdom | 464/139 |

Primary Examiner—Daniel P. Stodola
Attorney, Agent, or Firm—William D. Stokes

[57] ABSTRACT

A universal joint for drivably and flexibly coupling two shafts together. The universal includes a pair of body members for being removably connected to the shafts, a pair of arm members connected to and extending from each body member and connected to each other to form an interlocking relationship with the pair of arms extending from the other body member, an inner bearing seat member enclosed by the arm members and a plurality of spherical bearings operatively mounted in the seats formed by concavities in the inner seat member and concavities in the arm members. The individual elements of the joint may be disassembled, repaired or replaced without disconnecting the joint from the shafts and using only simple tools.

10 Claims, 24 Drawing Figures

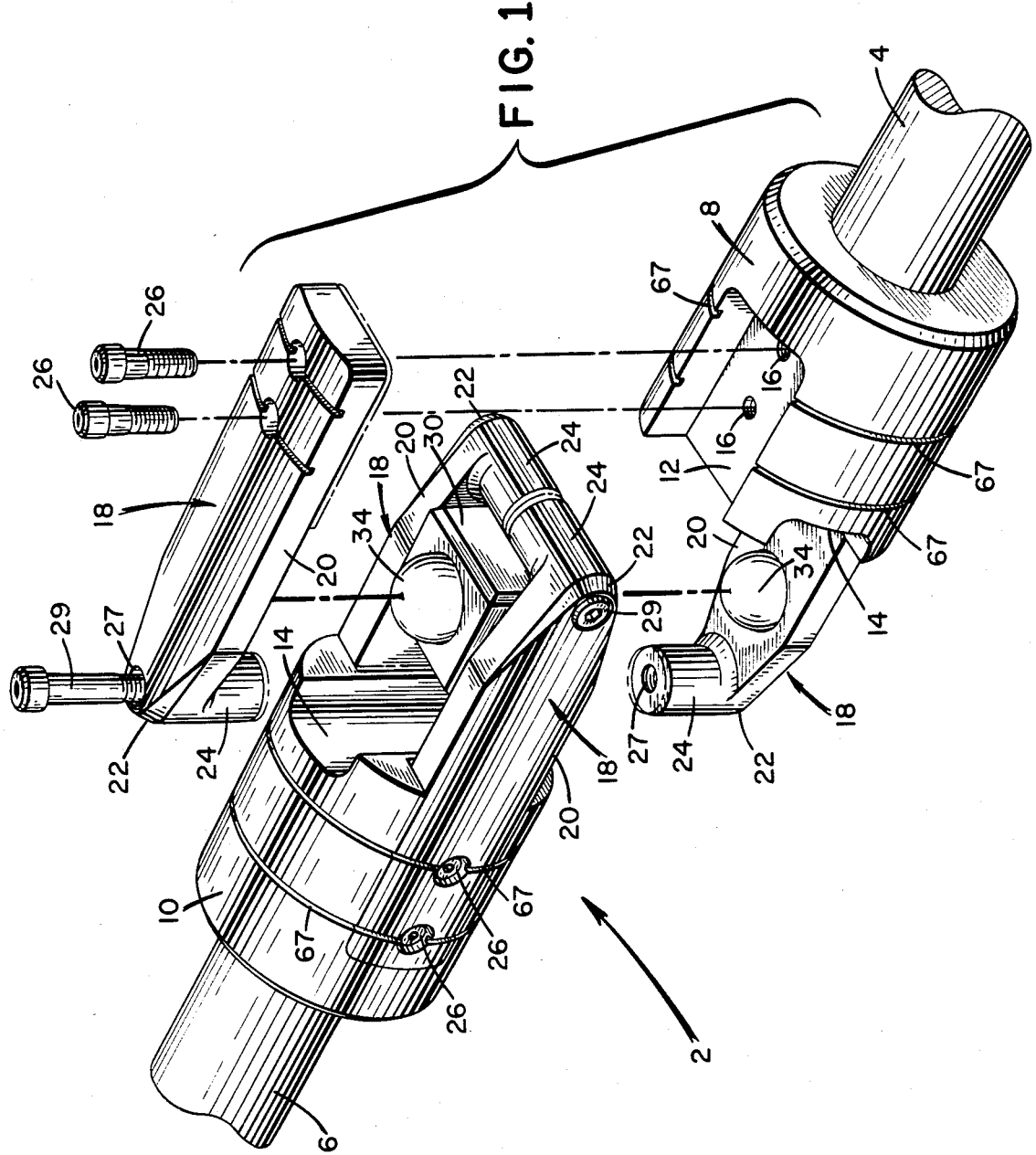

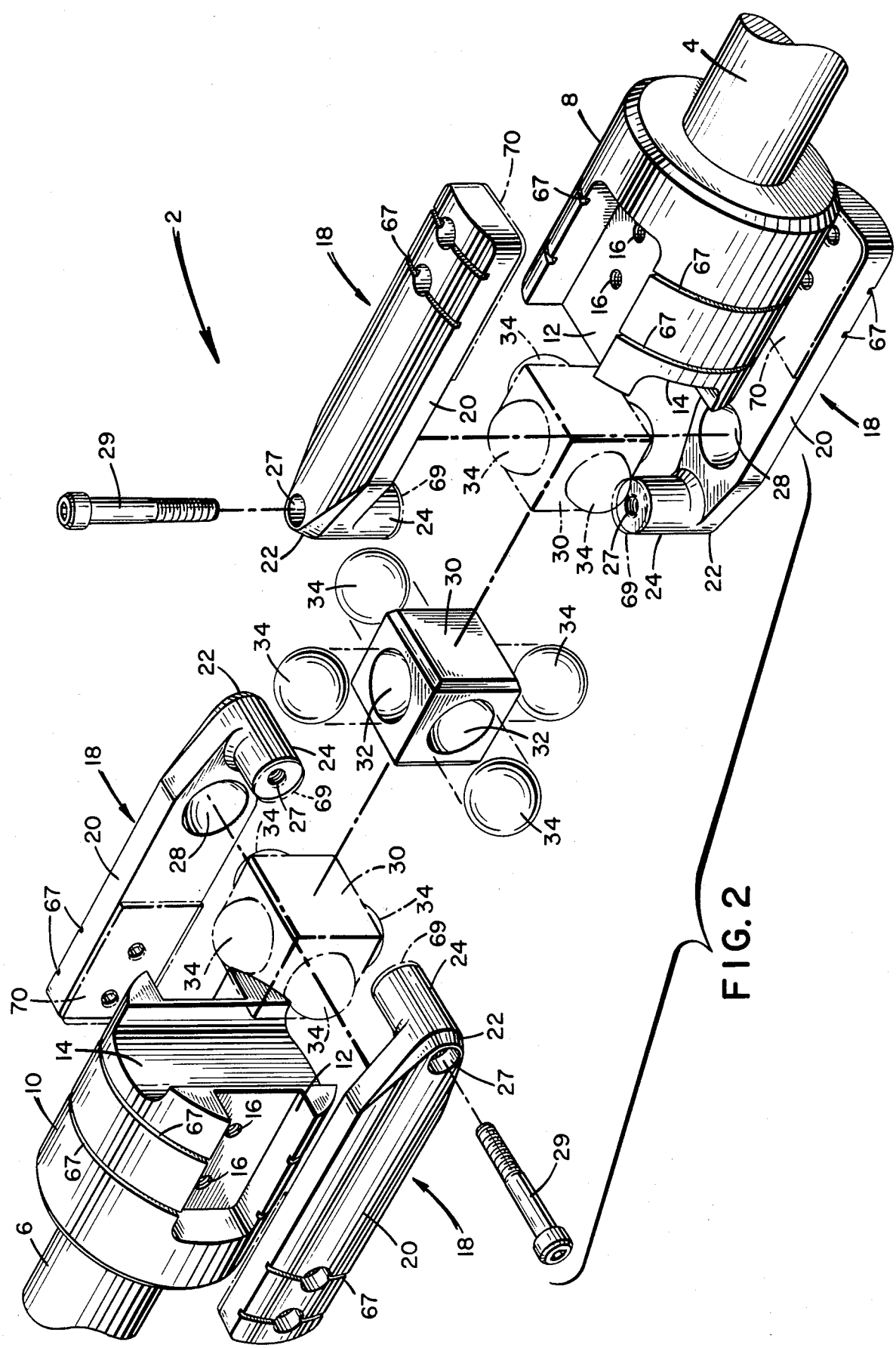

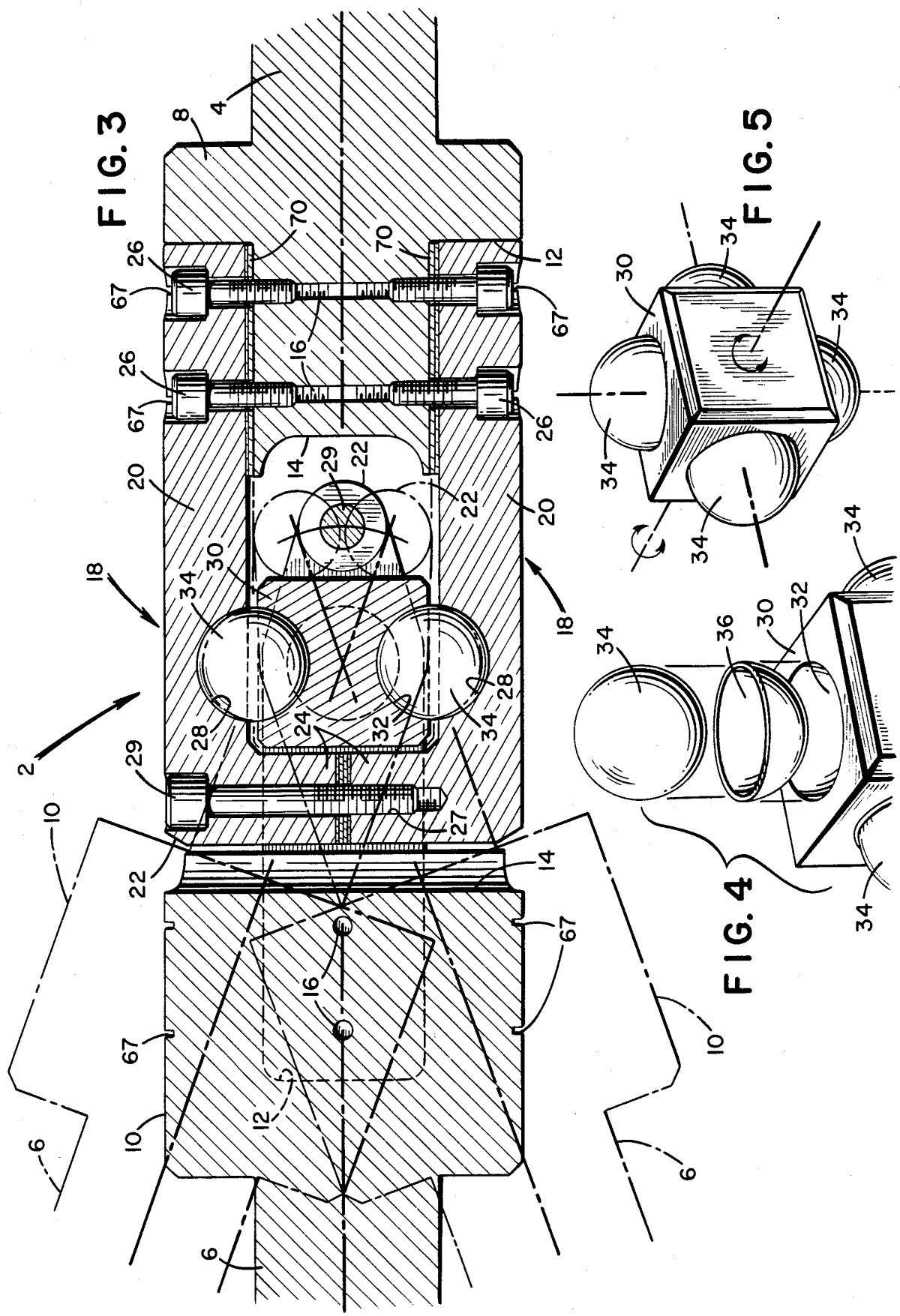

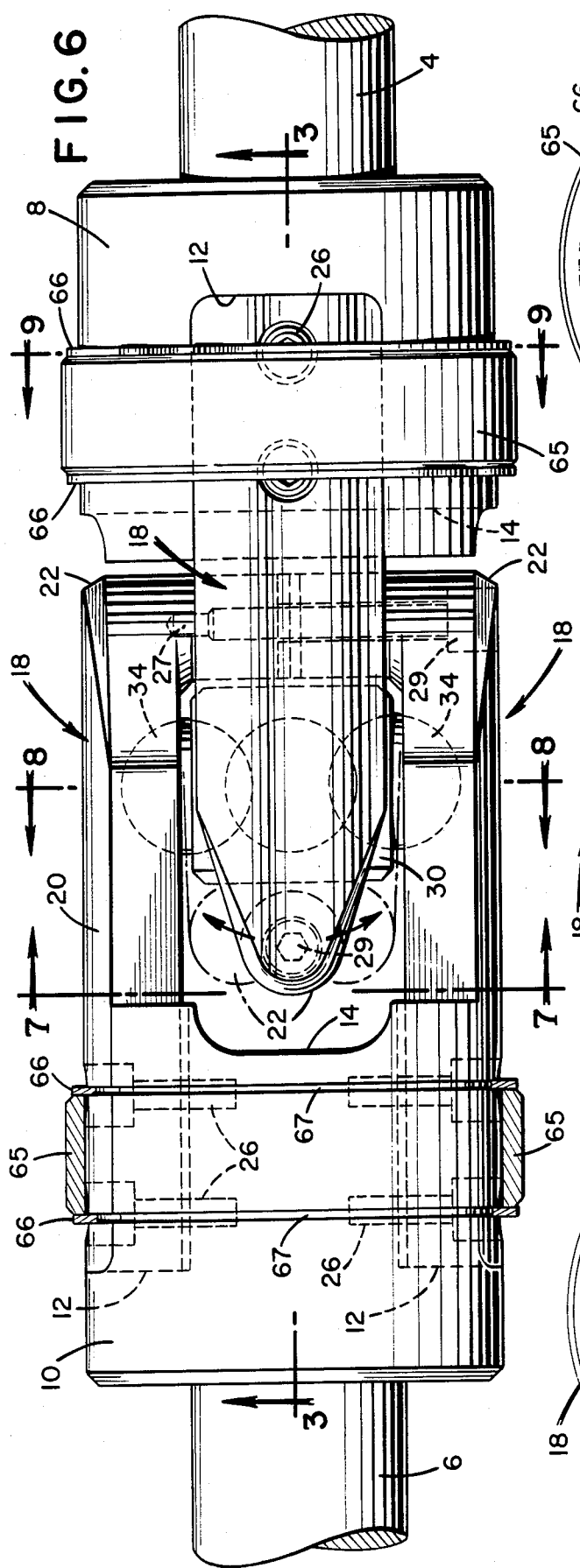
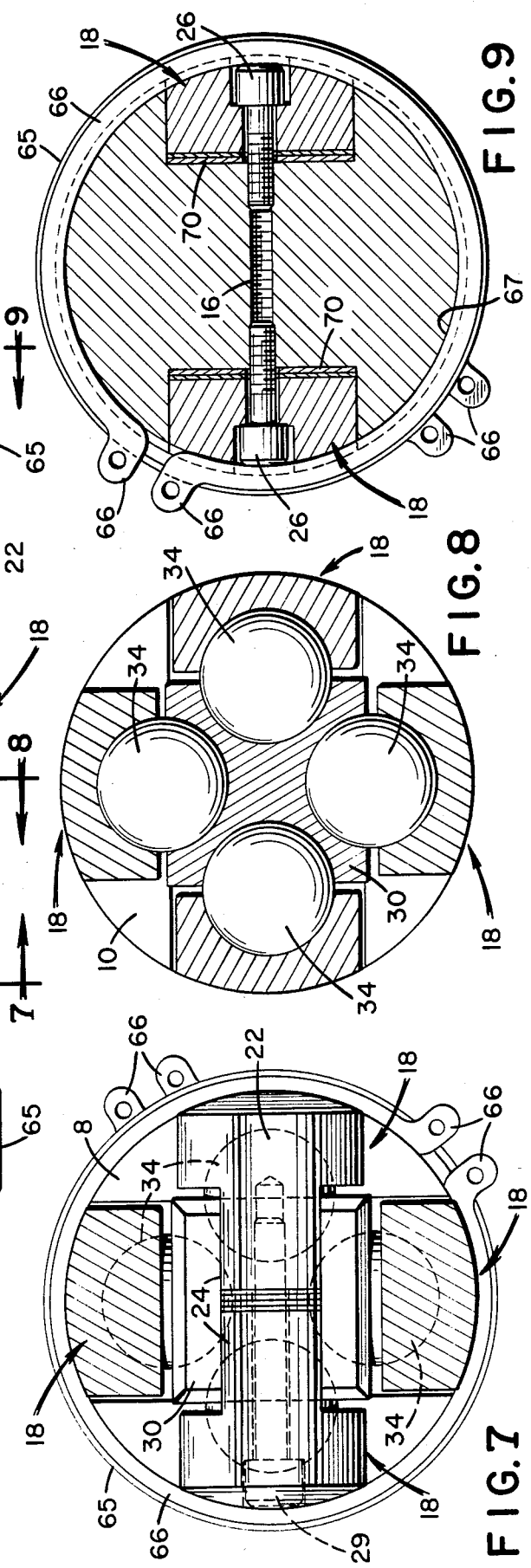

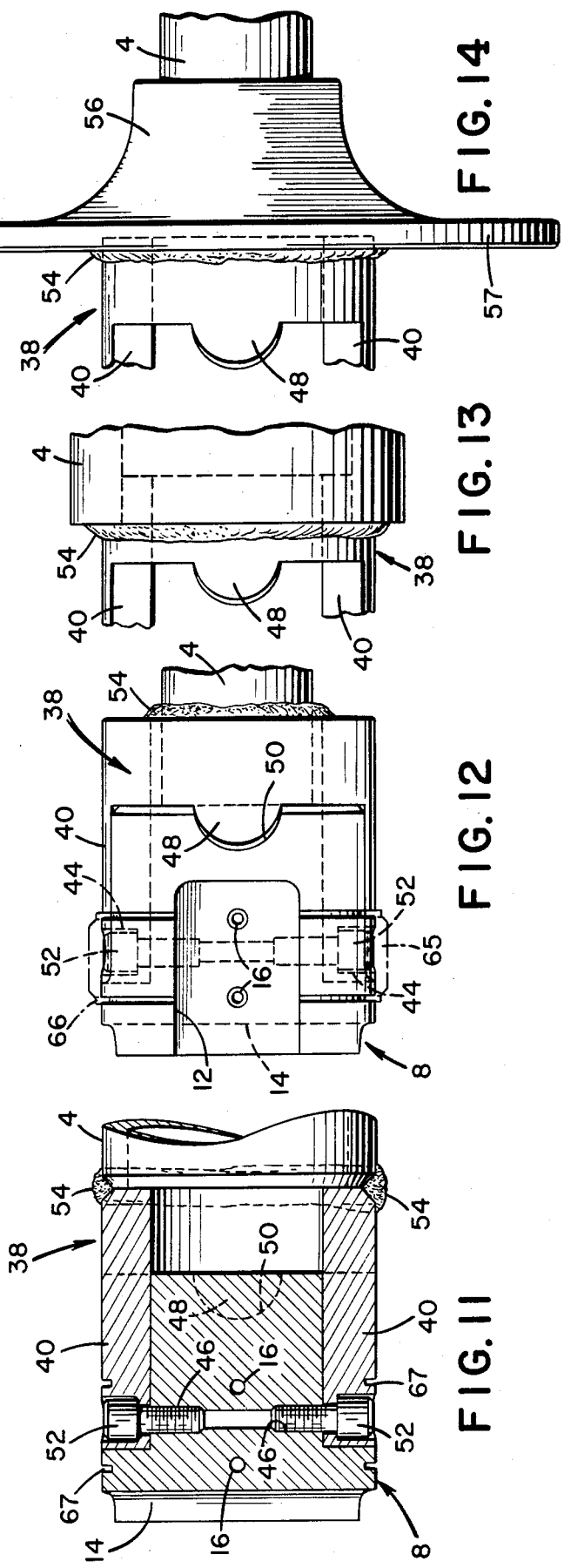

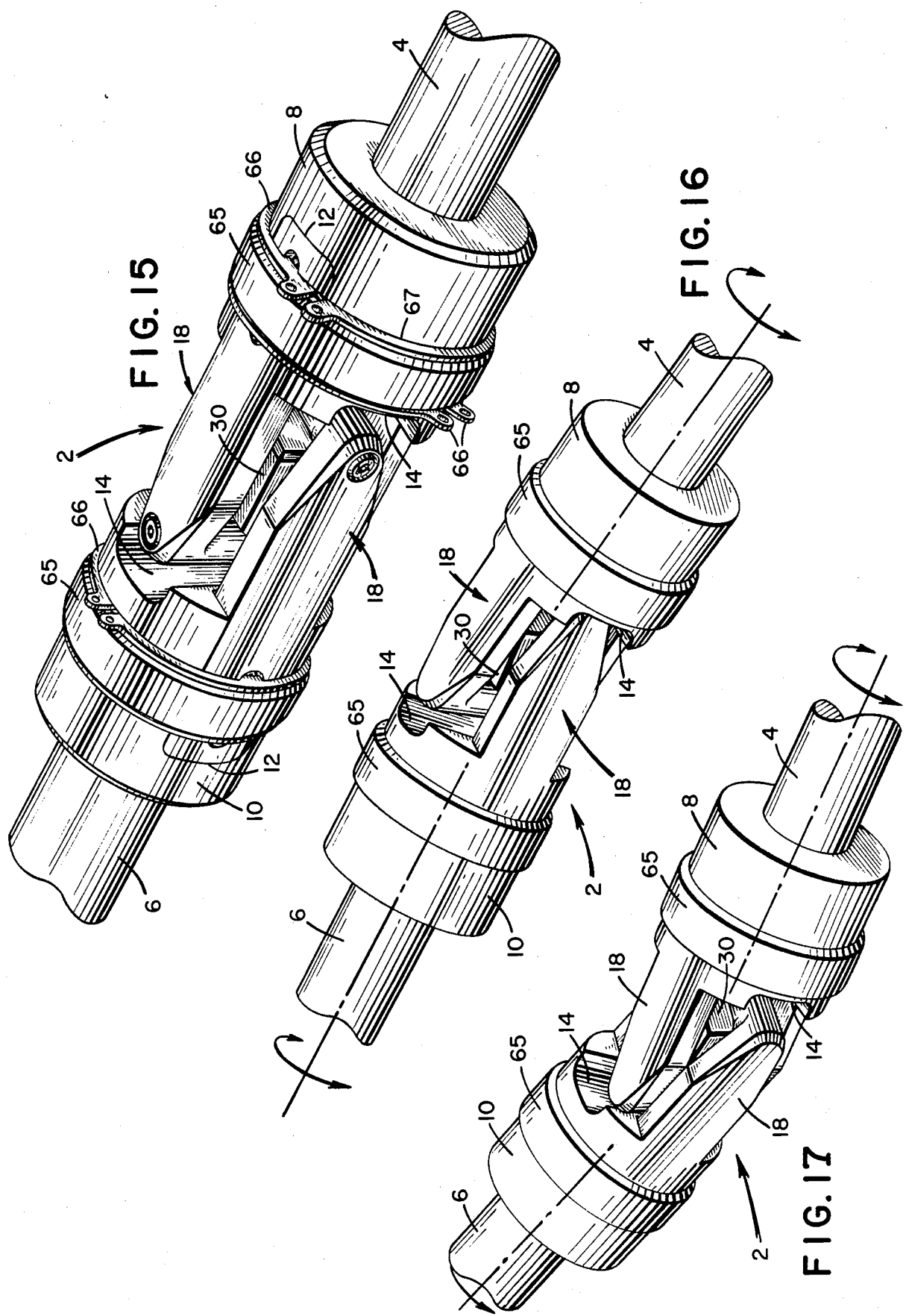

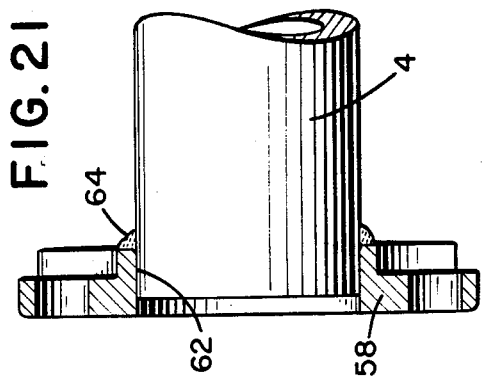
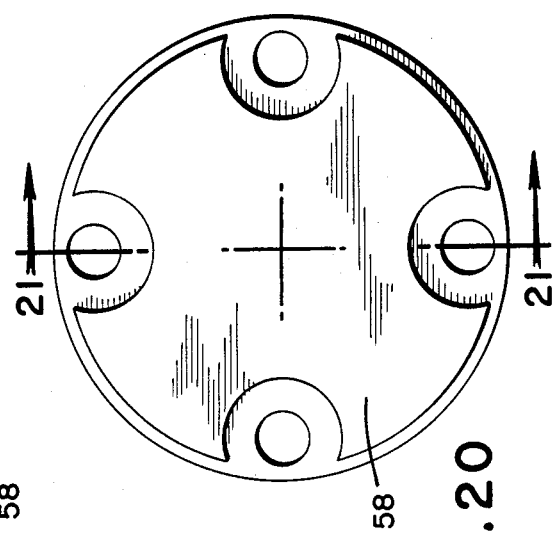
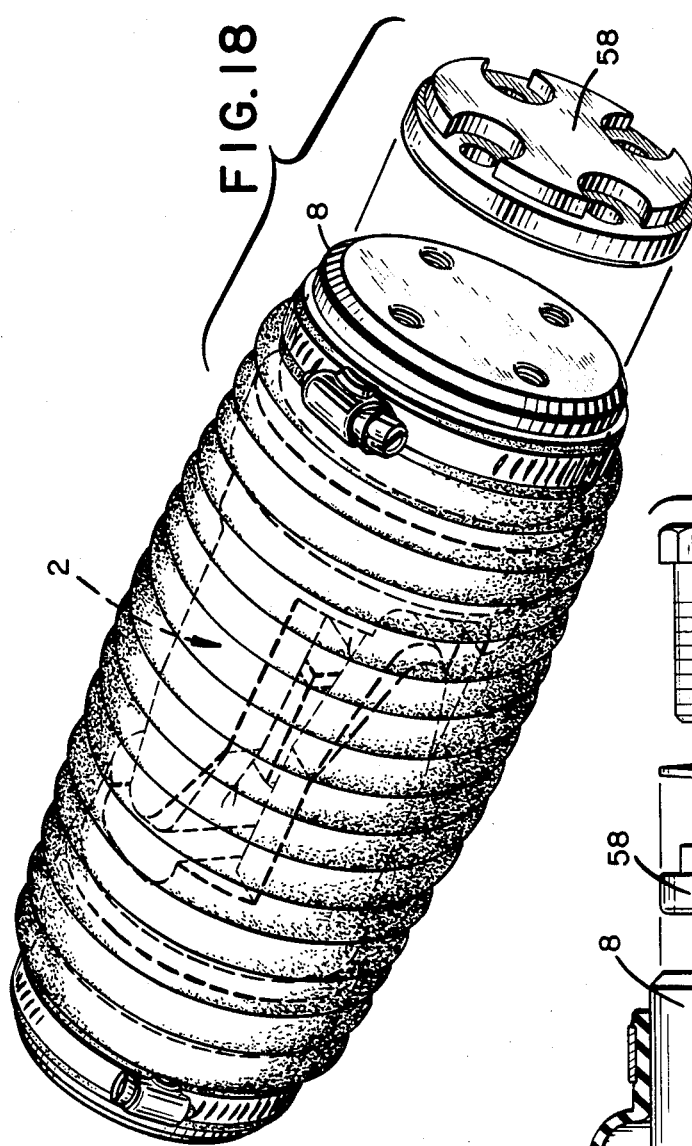
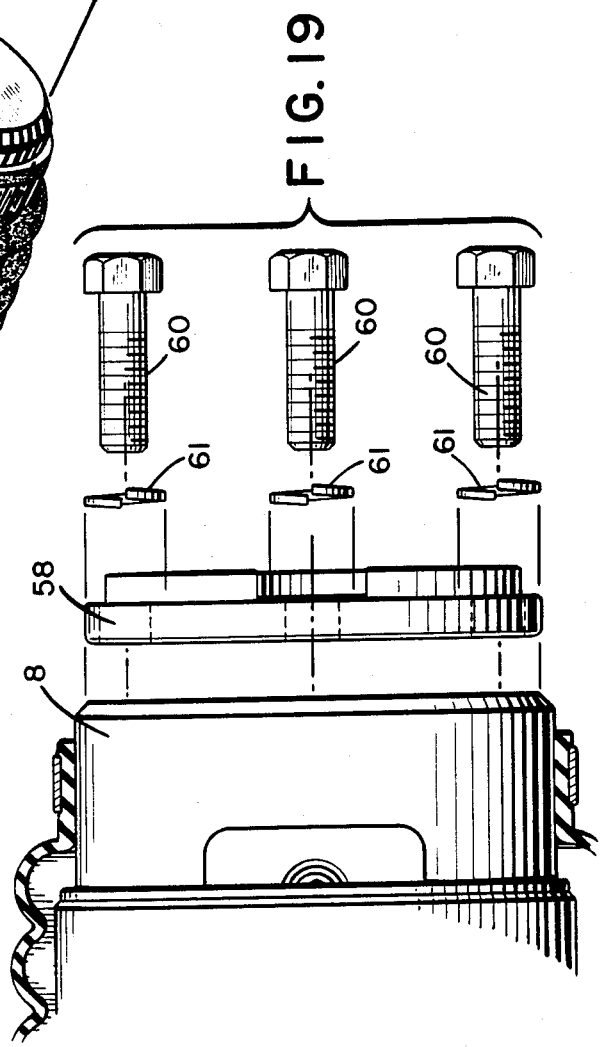

UNIVERSAL JOINT

FIELD OF THE INVENTION

The invention is directed to an improved universal joint and particularly to a simple, strong and practical universal joint for use on vehicles which may be readily repaired in the field without removal of the joint from the vehicle and disassembly thereof.

BACKGROUND OF THE INVENTION

A universal joint, as well known in the art, is simply a device for connecting two objects, as the ends of two shafts, so as to allow the objects perfect freedom of motion in every direction within certain defined limits. The principal purposes of a universal joint when used to connect two ends of a drive shaft for a vehicle is to allow the shaft to flex when the axle of the vehicle is moving. The universal joint absorbs the torsional shock and angular movement of the drive shaft when the vehicle travels over uneven terrain allowing the vehicle suspension to move up and down and unevenly on its springs. It is well known in the art that in agricultural and construction type vehicles the universal joint is subjected to an extraordinary amount of vibrations and stresses resulting in a substantial amount of wearing of the elements of a universal joint to the end that breakdowns are common, frequent and costly in that type of vehicle.

When excessive vibration occurs in a vehicle because of a breakdown or wearing of one or more elements of the universal joints of the art, there are few repairs that can be made at the site of the breakdown beyond, for example, tightening the flange bolts connecting the ends of the drive shafts to the joint, in the hope that such remedy will cure the vibration. In most instances of known universal joints, no repair of, or to, a universal joint can be made without removing the joint. It will be appreciated by those skilled in the art that when it is necessary to remove a universal joint from operative engagement for repair, the vehicle must be taken out of service, consequently shutting down the operation. The vehicle must be taken to a garage having the proper tools and lifts for the difficult job of removal. None of the universal joints of the art permit either easy field repair, or means to readily and effectively compensate for field repair. Exemplary of universal joints known in the art and to which the present invention represents an improvement are U.S. Pat. Nos. 714,327; 1,106,325; 2,903,868; 3,310,959; and 3,486,349; British Pat. Nos. 18,689 (1914) and 1,126,110; and German Pat. No. 719,856 (1942).

SUMMARY OF THE INVENTION

The present invention provides a strong universal joint which is relatively simple, practical, and which is extremely durable and can be repaired on-the-spot with a wrench or screwdriver should a breakdown occur. The universal joint of the invention is capable of handling greater horsepower than the universal joints of the art which are of comparable size and weight. The invention further provides a universal joint which is readily usable whereever a universal joint is called for.

The universal joint, hereinafter referred to as universal, comprises a first body member for securing to one end of a first shaft and a second body member for securing to one end of a second shaft. A pair of diametrically opposed arm members are operatively mounted at their shoulder ends with each body member and extend forwardly thereof; each pair of arm members are connected to each other at their wrist portion; a bearing seat member and a plurality of spherical bearings are held between and by the arm members and the inner seat member.

BRIEF DESCRIPTION OF THE DRAWINGS

FIG. 1 is a partially exploded perspective view of the universal joint of the present invention.

FIG. 2 is an exploded perspective view of the universal joint shown in FIG. 1.

FIG. 3 is a sectional, side elevational view taken along line 3—3 of FIG. 6.

FIG. 4 is a fragmentary, exploded perspective view of certain components of the bearing assembly employed in the universal joint of the present invention.

FIG. 5 is a perspective view of the bearing assembly employed in the universal joint of the present invention.

FIG. 6 is a top plan view of the assembled universal joint of the present invention.

FIG. 7 is a view taken along line 7—7 of FIG. 6.
FIG. 8 is a view taken along line 8—8 of FIG. 6.
FIG. 9 is a view taken along line 9—9 of FIG. 6.

FIG. 10 is an exploded perspective view of an embodiment illustrating a connecting means for connecting a drive shaft with the universal joint of the invention.

FIG. 11 is an illustration, partly in section, of the adaptor of FIG. 10 illustrating a means of connecting a tubular drive shaft with an adaptor connecting means.

FIG. 12 is a partial side elevation of the adapter connecting means of FIG. 10 illustrating a tubular drive shaft welded to the connecting means.

FIG. 13 is a side elevation illustrating a welded connection of a large drive shaft with the universal joint of the invention.

FIG. 14 is a side elevation illustrating disk type drive welded onto the adaptor connecting means of FIG. 10 for receipt of a drive shaft.

FIG. 15 is a perspective view of the assembled universal joint of the invention in straight through drive position.

FIG. 16 is a perspective view of the universal joint of the invention in an angular drive position.

FIG. 17 is a perspective view illustrating the universal joint of the invention in another angular drive position.

FIG. 18 is a perspective view illustrating the universal joint of the invention enclosed in a flexible dirt cover and illustrating, in exploded perspective, another drive shaft connecting means comprising an adaptor plate.

FIG. 19 is a side elevation of the end of the perspective view of FIG. 18 showing a fragment of the dirt cover in cross section with the shaft mounting adaptor embodiment and attachment means illustrated.

FIG. 20 is an elevation of a blank adaptor plate of FIG. 18.

FIG. 21 is a side elevation of an adaptor plate having a central bore for the receipt of a drive shaft to be mounted therein.

DESCRIPTION OF THE PREFERRED EMBODIMENT

Figure 23:
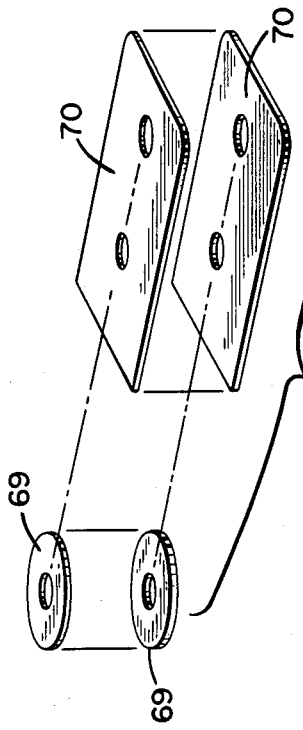
FIG. 23 is a perspective view of the shim arrangement on one side of the universal joint of the invention.
Figure 24:
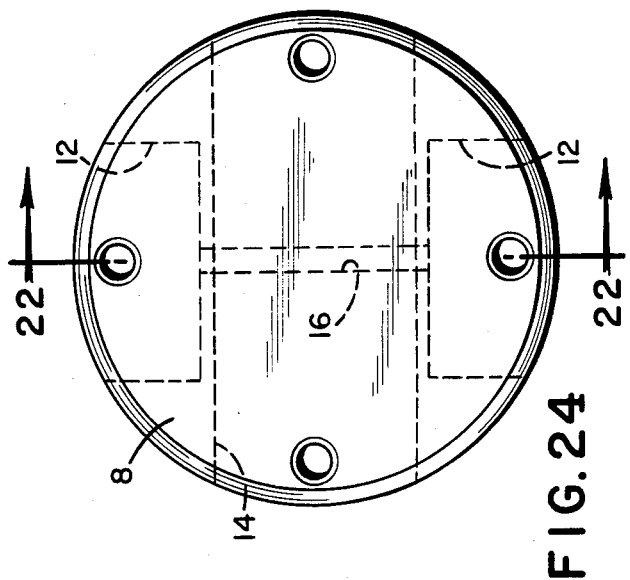
FIG. 24 is an elevation of an end of the universal joint for attachment of an adaptor plate for a shaft connection.

Referring to the drawings in which like elements have the same number, the universal 2 of the present invention is for drivingly and flexibly coupling one end of a drive shaft 4 to one end of a second drive shaft 6. The universal 2 includes a pair of body members 8 and 10 operatively connected on the ends of drive shafts 4 and 6 respectively.

In the preferred embodiments, body members 8 and 10 are constructed of a hard rigid metal in a generally cylindrical shape. Each of the body members 8 and 10 has a pair of elongated slots 12 in the outer surface thereof which slots 12 are positioned generally at 180 degrees with respect to each other. A semicylindrical shaped concave slot or groove 14 extends across the end faces of each of the body members 8 and 10 away from the shaft mounting ends thereof. The slots or grooves 14 extend across their respective body member transversely to elongated slots 12. A pair of threaded apertures 16 extend through the respective body members 8 and 10 interconnecting the elongated slots 12 for reasons to be explained hereinafter. As illustrated, particularly in FIG. 1 and 2, the universal joint 2 of the invention includes four arm members 18 which arm members comprise an upper arm portion 20, an elbow portion 22 and a forearm portion 24. The forearm portions 24 are joined at right angles to their respective upper arm portions 20. In the preferred embodiment, the forearm portions 24 of arms 18 are generally cylindrical in shape. It will be understood that the arms 18 are preferable of a unitary construction.

The upper arm portions 20 of arms 18 are detachably, but securely mounted in slots 12 of body members 8 and 10 by means of socket head cap screws 26, or any other type attaching means extending through apertures (not numbered) in the upper arm portions 20 into threaded apertures 16 of the body members 8 and 10 respectively. It is to be particularly noted in the illustrated embodiments, that the upper arms 20 are inwardly tapered toward their respective elbow portions 22. The threaded apertures 16 extending through the body members for interconnecting the upper arms 20 is a matter of convenience. In the illustrated embodiments, the cap screws 26 extend no more than halfway through the body members 8 or 10 as the case may be. It will be appreciated that a single bolt type attaching means for extending through the pair of arms and body member may be readily and conveniently used. Threaded apertures 27 are provided through the elbow portions 22 and through or into forearm portions 24 for connecting opposed pairs of arms 18 together by engaging means such as threaded bolts 29. As a matter of convenience and as shown in the illustrated embodiment, the threaded apertures 27 do not extend all the way through one of the opposed forearm portions 24. The upper arm portion 20 of each arm 18 is of such shape and dimensions to not only fit snugly within the slots 12, but also is preferably designed in such a manner that the outwardly exposed surfaces of the upper arms when installed are continuous with the generally cylindrical surfaces of their respective body members 8 and 10. The openings through arm member 18 for attaching means 26 and 29 are preferably countersunk in order that the heads of the attaching means do not extend above the surface of the arm when connected. Semicylindrical slots 14 in the facing ends of body members 8 and 10 allow the respective connected forearm members of the opposite body members free rotational movement enabling the construction of a more compact and stronger universal.

As illustrated, particularly in FIGS. 2 and 3, a hemispherical concave bearing seat 28 is disposed in the inside surface of each of the upper arm portions 20. A seat member 30 is provided which is generally cubical in shape and of such dimensions as to be grasped by the four arm members 18 when the arms are operatively connected to their respective body member and to each other through their forearms 24 as particularly illustrated in FIGS. 1, 15, 16 and 17.

Disposed in four of the faces of cubical seat member 30 are hemispherically dimensional concave seats 32 for being positioned toward and aligned with hemispherically dimensioned concave ball seats 28 in the inner surface of forearms 20 of arm members 18. When the ball seats 32 of seat member 30 are in operative alignment with the ball seats 28 of the arm members, a spherical seat is formed for the seating of ball bearings 34. The ball bearings 34 used in the invention are preferably constructed of a metal which is softer than the metal of which the universal joint is principally comprised, for example, bronze which is relatively soft compared to the hardened steel of which arm members 18 and cubical seat member 30 are preferably manufactured. In a preferred embodiment, a circumferential groove (not shown) surrounding the edges of the hemispherical cavity seats is provided for receiving o-ring gaskets to seal the bearing members from the contamination by water and debris. In another embodiment shown in FIG. 4 there are provided cup-like seat covers 36 made out of, for example, teflon, serving a dual purpose, namely to minimize wear of the bearings and as shims in the event of bearing wear or cavity seat damage.

The shaft members 4 and 6 of a vehicle may be suitably connected to the universal 2 of the invention in a variety of ways as exemplified in FIGS. 10, 11, 12, 13, 14, 19, 20 and 21. A particularly useful means of mounting the ends of drive shafts 4 and 6 to the respective body members 8 and 10 of the joint is illustrated in FIGS. 10, 11, 12, 13 and 14. In the illustrated embodiment, only body member 8 is illustrated. It will be appreciated that the description applicable to one body member is applicable to the other. As illustrated, a shaft connector or adaptor 38 is provided which, in effect, is a removably mounted extension of the body member 8. Shaft connector 38 comprises two elongated male key means 40 adapted to be slidably inserted into slots 42 provided on the surface of the body members 8 and 20 when this type of shaft connection is contemplated. Countersunk openings 44 are extended through key elements 40 adapted to align with threaded apertures 46 disposed in slots 42. In a preferred embodiment shaft connector 38 is also provided with a pair of male locking tabs 48 positioned substantially 90 degrees from male key elements 40 on connector 38. When key elements 40 are inserted in slots 42, tabs 48 will mate with tab slots 50 in the body member 8 further locking the shaft to the universal joint further preventing lateral play of the shaft. The shaft connector 38 is rigidly connected to body member 8 by means of screws 52 extending through the countersunk openings 44 and engaging with threaded apertures 46. It will be readily apparent that where such a construction is used, operative connection and disconnection of the inventive universal to the drive shafts is facilitated.

FIGS. 11, 12, 13 and 14 illustrate that shafts having varying diameters may be readily mounted on shaft connector 38 by, for example, welding 54. Referring particularly to FIG. 14, shaft 4 is shown mounted in a connector or adaptor member 56 comprising a flat plate member 57 welded to the shaft connector 38.

The shaft connecting means illustrated in FIGS. 18, 19, 20 and 21 comprises a detachable shaft mounting plate 58 which is adapted to be operatively connected on the shaft mounting ends of body members 8 and 10 by means of four equally spaced screw members 60 and washers 61. The plates 58 in the preferred embodiment are simply attached to the ends of shafts 4 and 6 as by welding (not shown). In the illustrated embodiment of FIG. 21, plate 58 is shown having a central socket 62 therein for easier connection to shaft member 4 and subsequent welding 64

In a preferred embodiment as illustrated in FIG. 15, screw retainer collars 65 are each secured to the body members 8 and 10 by a pair of spring retainer rings 66 positioned on both sides of a collar 65 in grooves 67 formed in the outer surface of the body members 8 and 10. Removal of the spring retainer rings 66 allows the removal of the corresponding screw retainer collar 65 and disassembly of that section of the universal joint.

Figure 22:
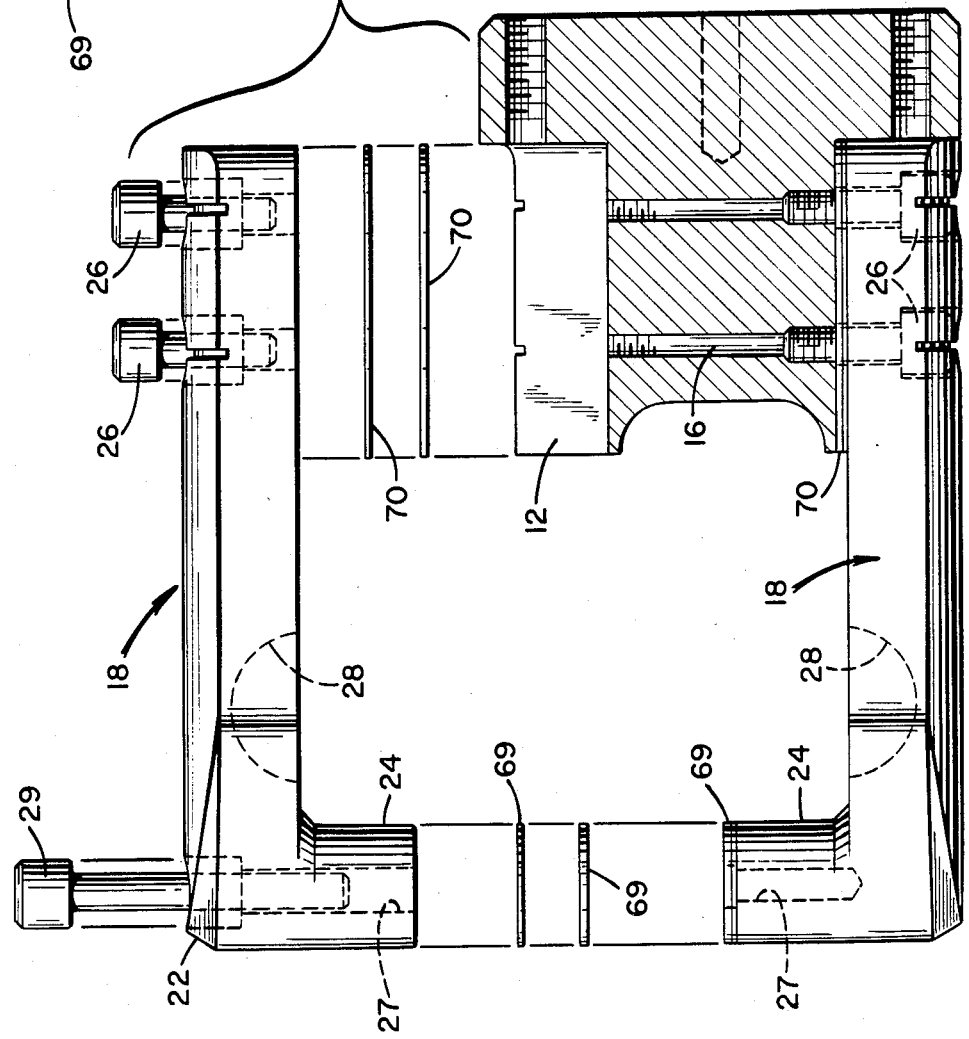
FIG. 22 is an exploded side elevation partly in section illustrating placement of shims in the device.

To assemble universal joint 2 and operatively connect the joint in a vehicle one simply securely attaches body members 8 and 10 to the respective ends of drive shafts 4 and 6 respectively by, for example, the shaft mounting means 58 illustrated in FIG. 21 and described hereinbefore. Arm members 18 are mounted in body members 8 and 10 by means screws of screws 26. The ball seat member 30, together with spherical bearings 34 seated in ball seats 28, is sandwiched and securely held by the four arms 18, each opposed pair of which are operatively connected by socket head screws or cap bolts 29 through apertures 27 in forearms 24. Forearms 24 move generally within the confines of grooves 14. It will be readily observed that even in the event of wear, disintegration, or breakage of one or more of the spherical bearings 34 the inventive joint will not come apart causing damage to the drive shafts and joint. Referring specifically to FIG. 22, and in the preferred embodiment, shims 69 are mounted or installed between each pair of opposed forearms. Likewise shims 70 are installed between the inner surface of the upper arms and their respective body member in slots 12. The various shims will wear during normal use of the joint, usually at different rates and points. It will be appreciated that one or more of the shims may be readily removed or replaced at any time to dimensionally offset the effects of wear.

FIGS. 15, 16 and 17 illustrate the universal of the invention in operation. These figures clearly show by arrows the complete rotational flexibility made possible by the novel construction of the invention. It will be appreciated from the forgoing description that the present invention provides a universal joint that has extraordinary flexibility and capable of handling more horsepower than the comparably sized universal joints of the art. Of the greatest importance is the fact that there is provided by the invention a simple, practical and relatively inexpensive universal which is readily adaptable to substantially any type of vehicle and may be, in the event of any type of breakdown, repaired on the spot using only a wrench or screwdriver to remove, for example, the holding screws 2 and 29. Moreover, the connections of the arms of universal of the invention insure a joint which will not come apart causing further damage even in the event that spherical bearings 34 break, wear or disintegrate.

From the forgoing description, it will also be readily observable that an improved universal joint is provided which can be maintained and repaired by one having a minimum of mechanical ability. For the reasons that, in the preferred embodiment, the spherical bearings are constructed of a relatively soft material, e.g., bronze, while the arm members 18 and the ball seat members 30 are constructed of relatively hard material such as steel, the bearings will be the only elements subject to wear. As the bearings wear the shims 69 and 70 may be simply and progressively removed to take care of the slack caused by the wear on the bearing. It will be perceived that even if the bearings become so worn that removal of the shims cannot take up the slack, the bearing may be entirely replaced with little mechanical effort and consequent shut down of operation.

Although the invention has been described and illustrated with respect to a preferred embodiment thereof, it is not to be so limited since changes and modifications can be made thereto with departing from the spirit and scope of the invention claimed in the following claims.

What is claimed is:

1. A universal joint for drivably coupling the free ends of two drive shafts comprising:
   a pair of body members having means for connecting each of said body members to the free end of one of the drive shafts;
   a pair of arm members connected to each of said body members, each of said arm members having an upper arm portion, an elbow, and a forearm portion disposed at a right angle to its upper arm portion, said upper arm portions being removably connected to a body member in such manner that each pair of arms connected to its body member is diametrically opposed and the respective forearm portions are in axial alignment and removably connected with each other;
   inwardly directed hemispherical bearing seats in each of the upper arm portions;
   a bearing seat member adapted to be held by the arm members, said bearing seat member having hemispherical concavities disposed therein and arranged to coact with said hemispherical bearing seats in each arm member;
   spherical bearings seated within the spherical seats formed by the coaction between said hemispherical bearing seats in the upper arm portions and the hemispherical concavities in said seat member.
   removable connecting means for attaching said arm members to their respective body member at the upper arm portion and to each other at their forearm portions, said arm members holding in secure alignment the spherical bearings in the respective hemispherical seats of the arms and the coacting hemispherical concavities in said bearing seat member.

2. The universal joint of claim 1 wherein said removable connecting means comprises a plurality of bolts.

3. The universal joint of claim 1 wherein said upper arm portions taper inwardly toward said elbow.

4. The universal joint of claim 1 wherein said body members have elongated slots for receiving the ends of said upper arm portions, said elongated slots being of such dimension that no portion of said arm members extend above the surface of said body members and in which said forearm portions have countersunk apertures for receiving said removable connecting means.

5. The universal joint of claim 4 wherein retainer collars are provided for enclosing said removable connecting means connecting said upper arm portions to said body members.

6. The universal joint of claim 1 wherein a cup-shaped insert is mounted in each of the hemispherical concavities in the seat member to provide a hardened seat for each spherical bearing 7. A universal joint according to claim 1 wherein a plurality of shims are mounted between the upper arms and their respective body member and between said aligned forearm members whereby shims may be progressively removed to dimensionally offset any effects of wear on the bearings.

8. The universal joint of claim 1 wherein said means for connecting said body members to said drive shafts comprises flanges detachably connected to each of the body members, the ends of said shafts being welded to the respective flange.

9. The universal joint of claim 1 wherein said means for connecting said body members to said drive shafts comprise a flange member having elongated projections therein, slots in the ends of said body members adapted to receive said projections on said flange members and detachable fastening means to connect said flange member to said body member.

10. A universal joint for drivably coupling the free end of two drive shafts comprising;
- a pair of body members each connected to an end of one of the drive shafts;
- a pair of arm members connected to each of said body members, each of said arm members having an upper arm portion, an elbow and a forearm portion disposed at a generally right angle to its upper arm portion, said upper arm portions being connected to their free end to a body member in such manner that each pair of arms connected to its body member is diametrically opposed to each other and the respective forearms portions are in detachably connected axial alignment with each other;
- a hemispherical concave bearing seat in each of the upper arm portions said bearing seats being inwardly directed and substantially diametrically opposed to one another when the arms are connected to their respective body member,
- a bearing seat member including face surfaces, hemispherical concavities in said face surfaces located adjacent to and directed toward a bearing seat in an arm member to form a spherical bearing seat;
- spherical bearing sealed within said spherical seat;
- detachable fastening means extending between said upper arm portions and their respective body member said arm members holding the bearings in the respective spherical seats whereby the arm members can be disconnected from each other to facilitate replacement of worn bearings.

* * * * *